United States Patent [19]
Vaughan et al.

[11] Patent Number: 5,905,497
[45] Date of Patent: May 18, 1999

[54] AUTOMATIC AND SEAMLESS CURSOR AND POINTER INTEGRATION

[75] Inventors: Mark P. Vaughan, Spring; Derrill L. Sturgeon; Christopher A. Howard, both of Houston; Kevin J. Brusky, Magnolia, all of Tex.

[73] Assignee: Compaq Computer Corp., Houston, Tex.

[21] Appl. No.: 08/828,525

[22] Filed: Mar. 31, 1997

[51] Int. Cl.$^6$ .............................. G09G 5/08; G06F 3/14
[52] U.S. Cl. ..................... 345/352; 345/157; 345/327
[58] Field of Search .................. 345/352, 353, 345/333, 337, 145, 157, 167, 164, 179, 150

[56] References Cited

U.S. PATENT DOCUMENTS

| | | | |
|---|---|---|---|
| 4,628,541 | 12/1986 | Beavers | 375/309 |
| 4,658,247 | 4/1987 | Gharachorloo | 345/196 |
| 4,686,649 | 8/1987 | Rush et al. | 345/157 |
| 4,775,928 | 10/1988 | Kendall et al. | 395/760.02 |
| 4,954,819 | 9/1990 | Watkins | 345/340 |
| 5,198,802 | 3/1993 | Bertram et al. | 345/157 |
| 5,291,275 | 3/1994 | Lumelsky | 348/441 |
| 5,451,981 | 9/1995 | Drako et al. | 345/118 |
| 5,488,393 | 1/1996 | Wood et al. | 345/213 |
| 5,502,462 | 3/1996 | Mical et al. | 345/507 |
| 5,524,195 | 6/1996 | Clanton, III et al. | 345/348 |
| 5,543,824 | 8/1996 | Priem et al. | 345/508 |
| 5,548,304 | 8/1996 | Yoshino et al. | 345/145 |
| 5,572,698 | 11/1996 | Yen et al. | 711/110 |
| 5,610,663 | 3/1997 | Nan et al. | 348/554 |

OTHER PUBLICATIONS

"Gateway 2000 Sells Destination Big Screen PC Through Retail Chains"; Internet article; Aug. 20, 1996; pp. 1–4.

"Gateway 2000 Launches Destination Big Screen PC Featuring 31–inch Monitor"; Internet article; Mar. 21, 1996; pp. 1–5.

"The Big–Tube PCTV"; PC Online/Trends Online; May 28, 1996; pp. 1–3.

"Destination Features"; Internet article; Aug. 21, 1996, pp. 1–5.

"Telefuzion"; Internet article; Mar. 12, 1997; pp. 1–2.

"High–Tech; Now you can tune your TV to the Internet"; Mike Snider; USA Today; Sep. 18, 1996; pp. 1–2.

*Primary Examiner*—Raymond J. Bayerl
*Assistant Examiner*—Cao H. Nguyen
*Attorney, Agent, or Firm*—Jenkens & Gilchrist, P.C.

[57] ABSTRACT

A computer system has a computer display with two methods of navigation: discrete and continuous. In discrete navigation, a cursor is moved discretely using a set of arrow keys while in the continuous navigation, a pointer or other screen object has analog movement to any position on the screen using a trackball or other device. When the discrete navigational method is used to highlight a menu item in a menu on a computer display, the computer system masks the display of the pointer until re-activation of the pointer in the second navigational method. In addition, the computer system recalculates the location of the pointer to a position in the center of the highlighted menu item.

22 Claims, 4 Drawing Sheets

AUTOMATIC AND SEAMLESS CURSOR AND POINTER INTEGRATION

BACKGROUND OF THE INVENTION

1. Field of the Invention

The present invention relates to computer displays, and more particularly to the automatic integration of a cursor and a pointer in the selection of menu items in a computer display.

2. Description of the Related Art

Typically, computers have two general methods to select the position of a cursor on a computer display. The first method uses arrow keys, either up, down, left or right, to control the cursor to move sequentially through positions in either rows or columns of a computer. This first method is called discreet navigation.

The second method uses a trackball on a keyboard or mouse or a touch pad or other device to direct a pointer or other screen object on the computer display. The trackball or other device moves the pointer or other screen object through analog control of speed and direction to any position on the computer display. The cursor position can then be moved to the position of the pointer by for instance, selecting a button on the mouse or keyboard or tapping the touch pad. This second method is called continuous navigation.

In current computer systems, whether discreet or continuous navigation is used to control cursor position, both the pointer and cursor are displayed simultaneously on the computer display.

Similarly, in the selection of menu items, for example in pull down menus in window applications, the discreet navigational method sequentially moves through the menu items with each menu item being sequentially highlighted or otherwise differentiated in response to the arrow keys. Alternatively, in the continuous navigational method, a pointer moves under the control of a trackball or touchpad or other device to randomly select a menu item from the menu. Once the pointer overlays a menu item, the menu item may then be highlighted or otherwise differentiated by tapping the touch pad or pushing a selection button on the mouse or keyboard. Again in typical computer systems, both the pointer and cursor are displayed, without regard to whether the discreet or continuous navigational methods are used to select the menu items.

Furthermore, the pointer in typical computer systems remains in its last position despite the movement of the cursor. For example, when the cursor moves under the control of arrow keys in the discrete navigational method, the pointer will remain in its last position designated by the trackball or touchpad. This often creates confusion as to the location of the pointer, especially when the cursor has moved a significant number of lines from the last pointer position.

In addition, with the growing use of wireless keyboards and big screen monitors, users of a computer no longer need to be in close proximity to the monitor. At a distance, it is more difficult to discern the location of the pointer, especially during the selection of menu items.

As a result of these characteristics, the display of both the cursor and pointer in typical computer systems is distracting and confusing. A need has thus arisen in the industry for an improved method and apparatus for the seamless display of a cursor and pointer and selection of menu items in a computer system.

SUMMARY OF THE INVENTION

The present invention is directed to a computer system having a computer display, a first device to control discrete movement of a cursor on the computer display in a first navigational mode, and a second device to control analog movement of a screen object on the computer display in a second navigational mode. The computer system masks the screen object in response to highlighting a menu item in the first navigational mode and relocates the screen object to a position on the computer display corresponding to the highlighted menu item.

Another embodiment of the present invention is directed to a computer system including a convergence functionality module and a computer coupled to the convergence functionality module which operates in a first functional mode in response to the convergence functionality module and a second computer mode. The computer includes a display for displaying a system menu; a first device for controlling discrete movement of a cursor on the display in a first navigational method; a second device for controlling continuous movement of a screen object on the display in a second navigational method; and a controller for masking the screen object in response to highlighting a menu item on the system menu in the first navigational method and for relocating the screen object to a position corresponding to the highlighted menu item.

BRIEF DESCRIPTION OF THE DRAWINGS

The present invention is now explained in more detail with reference to the following drawings, wherein like numerals are used to designate like parts.

DETAILED DESCRIPTION OF THE INVENTION

Figure 1:
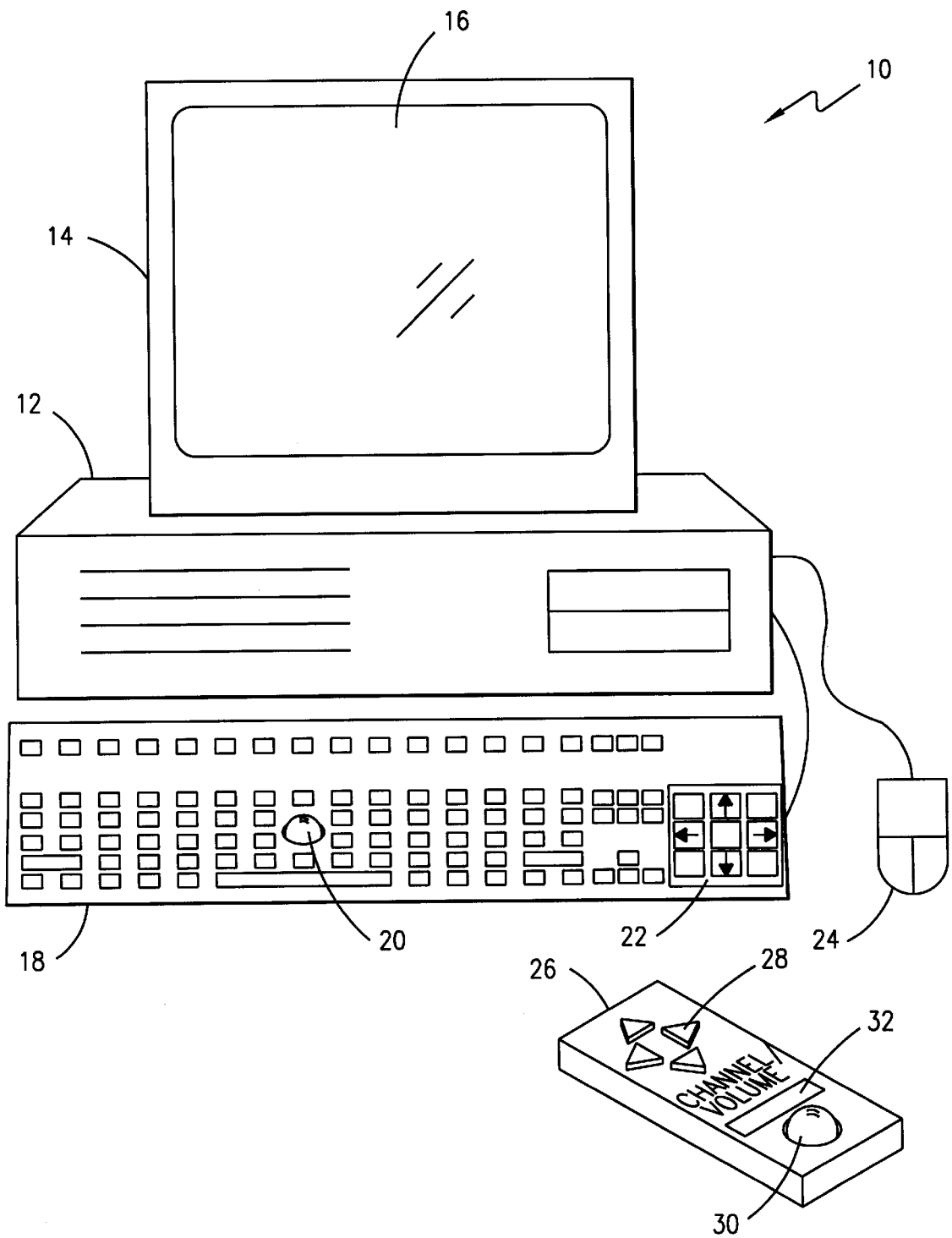
FIG. 1 illustrates a block diagram of a computer system in which the present invention may be used.

FIG. 1 illustrates a computer system 10 in which the present invention may be used. The computer system 10 includes a central processing unit (CPU) 12, a monitor 14 with computer display 16, and a keyboard 18. The keyboard 18 also includes a trackball 20, and arrow keys 22. The arrow keys 22 are typically integrated as part of a numerical keypad on the keyboard 18, though arrow keys 22 may be implemented as other keys as well. The computer system 10 includes a mouse 24 which also has a trackball (not shown). In addition, the computer system 10 includes a remote 26, which is explained in more detail below with reference to FIG. 4. The remote 26 includes arrow keys 28, trackball 30, and navigational button 32. Alternatively, or in addition to the mouse 24, a touch pad (not shown) may be included in the computer system 10.

The continuous navigational method of the present invention can be controlled by either the mouse 24 or the trackball 20 on the keyboard 18 or the trackball 30 on the remote 26. In addition, a person of skill in the art will appreciate that the continuous navigational method of the present invention may be also controlled with any other device which controls the operation of a pointer and that the pointer may be any screen object which moves in a continuous manner. The discreet navigational method of the present invention may be controlled by the arrow keys 22 on the keyboard 18 or the arrow keys 28 on the remote 26. Again, a person of skill in the art will appreciate that the discreet navigational method of the present invention may be controlled by other keys or devices that discreetly control the movement of the cursor. The discreet and navigational methods may be used interchangeably. The computer system 10 automatically switches between either the discreet and navigational method depending on whether the arrow keys or trackball or touchpad type device are activated.

In the present invention, the pointer is masked during the use of the discreet navigational method. The location of the pointer is automatically adjusted to the center of a menu item highlighted in response to input of the arrow keys. When a trackball or other device is next moved in the continuous navigational method, the pointer will reappear in the proximity of the center of the highlighted menu item.

Figure 2:
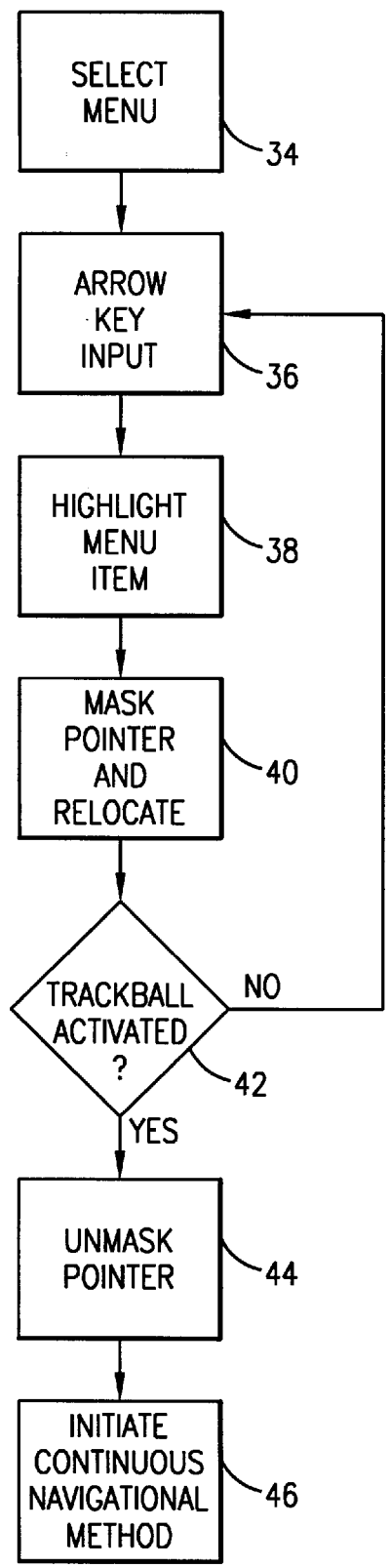
FIG. 2 illustrates a flow chart of the continuous navigational method of the present invention.

The discreet navigational method of the present invention is explained in more detail with reference to FIG. 2. In step 34, a menu on the computer display is selected by using the pointer or by selecting a predetermined menu select button or key which corresponds to the menu on the keyboard 18 or remote 26. If the arrow keys are activated as depicted in step 36, menu items on the menu are consecutively highlighted in response to selection of the arrow keys, as shown in step 38. The menu item may be highlighted by changing the color of the menu item, or its border, or otherwise differentiating the menu item from other menu items.

Once highlighted, the menu item may be selected by activating a predetermined select key, such as the enter key on keyboard 18 or a button on the mouse 24, or by using another similar method that initiates the execution of the highlighted menu item. The pointer is automatically masked in response to use of the arrow keys to highlight a menu item so that the pointer is no longer visible on the computer display 16, as shown in step 40. The pointer may be masked by disabling the generation of the cursor in the graphics controller, or alternatively, by reconfiguring the size of the cursor to a single pixel. A single pixel is difficult to discern and will also cause less confusion and disruption when in the discreet navigational mode.

In step 40, the computer system 10 also automatically relocates the position of the pointer to the center of the highlighted menu item. The computer system 10 continuously monitors whether a trackball is moved in step 42. If not, the computer system 10 continues to highlight the menu item selected by the arrow keys, to mask the pointer, and to recalculate the pointer's location as the center of the highlighted menu item. If the trackball is moved, the computer system 10 then unmasks the pointer in step 44. The pointer will reappear near the center of the highlighted menu item (depending on the initial movement of the trackball). The highlighting and selection of the menu item will then be controlled using the steps of the continuous navigational method as depicted in step 46 (until the arrow keys are again activated).

Figure 3:
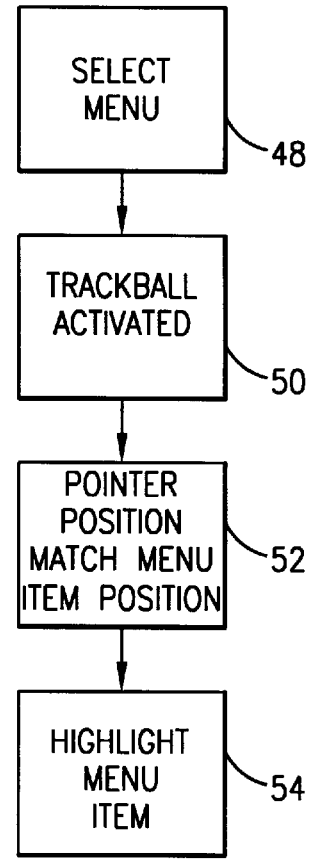
FIG. 3 illustrates a flow chart of the discrete navigational method of the present invention.

The continuous navigational method is explained in more detail with reference to FIG. 3. In step 48, a menu is selected as explained above in step 34 of FIG. 2. If a trackball or touchpad or similar device to control a pointer is activated, the computer system 10 compares the position of the pointer to each of the menu items in the menu. When the position of the pointer coincides with a menu item, the menu item is automatically highlighted. The pointer coincides with a menu item when the pointer pixel position on the screen either partially or wholly overlays the menu item or when the pointer pixel position is adjacent or close to the pixel position of the menu item. Once highlighted, the user may then select the menu item by activating an enter key on keyboard 18 or a clicking a button on the mouse 24 or other similar method.

The present invention thus has the advantage that the pointer will not distract or obscure other elements of the screen while in the discreet navigational mode. In addition, the pointer location is automatically updated to the center of the highlighted menu item so that when activated, the pointer position is easily located on the screen in close proximity to the center of the highlighted menu item. In addition, menu items are more easily selected in the continuous navigational method since menu items are automatically highlighted in response to the pointer position without activating a mouse or enter button.

Figure 4:
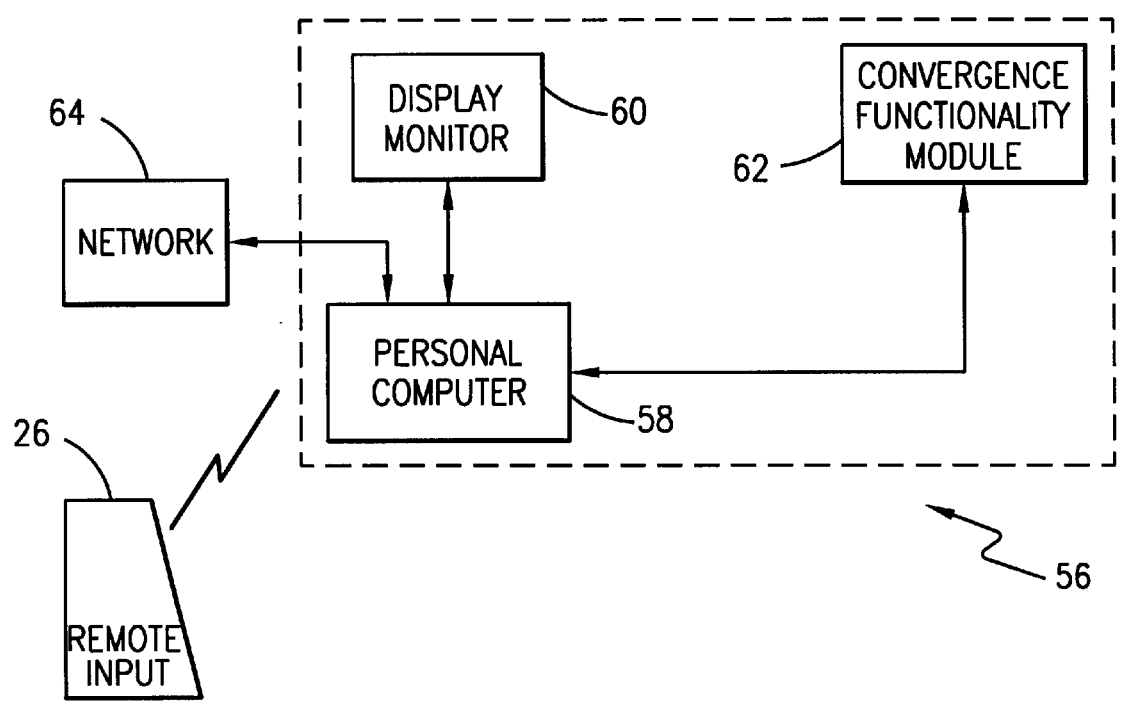
FIG. 4 illustrates a block diagram of an alternate computer system in which the present invention may be implemented.

The present invention has additional advantages when used in an alternate computer system such as that shown in FIG. 4. FIG. 4 illustrates a computer system 56 which includes a computer 58 and display monitor 60. Though not shown in FIG. 4, the computer 58 includes a central processor unit coupled to a storage unit, a graphics controller and may further include a commination port for enabling communication to a network 64. The network 64 may be a local area network or a wide area network, such as the Internet, or any other type of network.

The computer system 56 also includes convergence functionality modules 62 which are integrated with the computer 58. The convergence functionality modules 62 provide a dual functionality to the computer system 56 such that the computer system may operate in computer mode and a second functional mode, such as a television, VCR, video gaming unit, video disc player, stereo, telephone, and/or other device mode. The computer system 56 operates as a fully functional computer system in the first computer mode and operates with a functionality provided in response to the convergence functionality module 62 in the second mode, or operates in a combination mode that combines the functionality of the computer 58 and the convergence functionality module 62. The graphics controller in the computer 58 manages the data input from the convergence functionality module 62 such that appropriately decoded and processed display signals are forwarded to drive suitable output devices, such as the display monitor 60, or an audio output device (not shown).

For example, when the convergence functionality module 62 provides the functionality of a television receiver, the computer system 56 may operate as a fully functional computer in a first mode and a television in a second television mode. In television mode, the convergence functionality module 62 receives a video signal, such as the National Television Committee (NTSC) signal, via any medium, digital or analog, such as cable, broadcast, or Digital Satellite System. The computer 58 interfaces with the convergence functionality module 62, and the graphics controller in the computer 58 manages the video signal input, converts the video signal, such as an NTSC interlaced signal, to a signal, such as VGA signal, which is suitable for display on display monitor 60. The information received from the convergence functionality module 62 is then displayed on the display monitor 60.

In computer mode, the computer 58 operates as a typical computer and performs typical functions such as executing software and interfacing with a network, either a WAN, such as the Internet, or a LAN. The computer 58 may also interface with peripheral devices, such as fax/modems, CD-ROM players, and media storage such as hard and floppy drives.

In addition, the computer system 56 may operate in a combination television/computer mode that combines the functions in the television mode and computer mode. The computer system may download information about a television program from the Internet or use the television mode to interact with the computer mode by having a small television window displaying a television show or video from an attached VCR while performing normal computer operations on the display monitor 60. The computer system 56 can thus be operated in various modes. The convergence of the functionality of a computer and a television into a single device permits the utilization of the communications bandwidth, mass storage and graphics of the computer to deliver, store and display applications during a traditional television viewing environment.

In computer system 56, a user can readily switch between computer mode and television mode using a navigational button 32 on remote 26 which triggers the display of a main system menu on the display monitor 60 in either television or computer mode. The system menu includes various menu items such as television mode, computer mode, or combination mode. The selection of a menu item may in turn generate a submenu with other options. A keyboard, such as keyboard 18, may also have a designated key to act as the navigational button. In television mode, the display monitor 60 will not include a menu selection which is typically shown on a display border in a windows environment in computer mode. Thus, the navigational button 32 on the remote 26 or keyboard 18 is necessary to access the system menu when in television mode. However, when in computer mode, the system menu may be accessed with either the navigational button 32 or by selecting from the system menu from the various menu options on the screen display.

Once the system menu is accessed, the present invention allows a user to highlight a menu item in the system menu through use of either the continuous or discreet navigational methods. The arrow keys 28 on the remote 26 or on a keyboard such as keyboard 18 control the selection of menu items in a discreet navigational method when the system menu or other menu is displayed. When a menu is not displayed, the arrow keys 28 on the remote 26 may function as either volume or channel controls for the television mode. As described in FIG. 2, the pointer is masked during the discreet navigational method and its position is relocated to the center of a highlighted menu item. Once a trackball or other device is used, the pointer will again reappear close to the center of the selected menu item. In continuous navigational mode, as described in FIG. 3, the menu item is automatically selected when the pointer position coincides with the position of the menu item.

Figure 5:
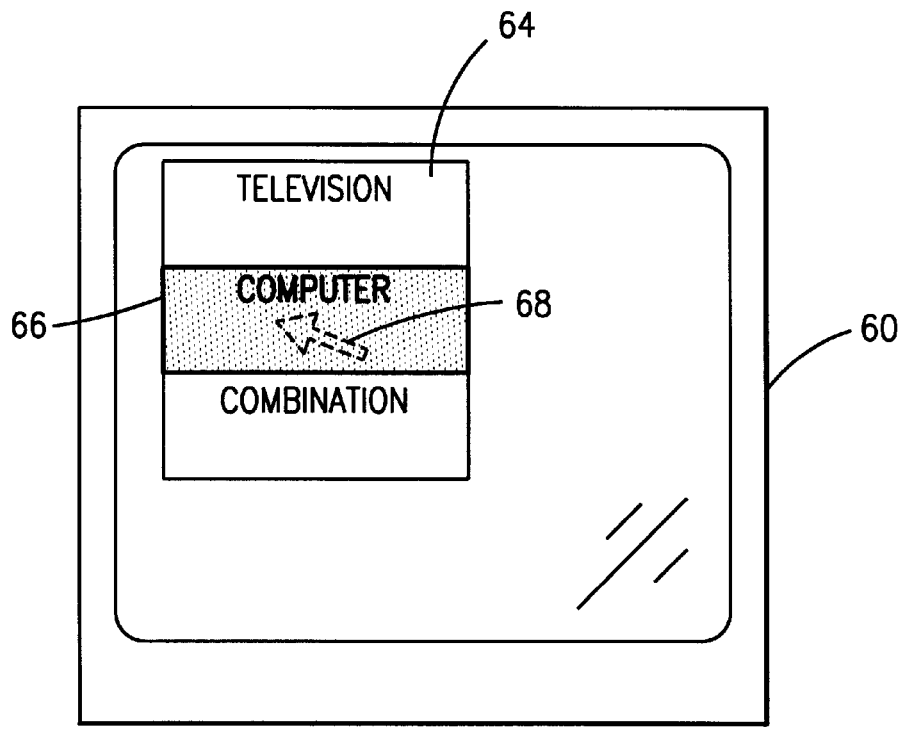
FIG. 5 illustrates an example system menu of the present invention.

An example of a screen 64 on the display monitor 60 is shown in FIG. 5. The screen 64 displays a system menu 66. The system menu 66 in this example includes three options: television mode, computer mode, and combination mode, though a person of ordinary skill in the art would appreciate that any number of options or any type of menu may be displayed. The center menu item, the computer mode option, has been highlighted using the discreet navigational method. A pointer 68 is shown in dashed lines in the center of the computer menu item to indicate the location of the pointer 68. However, the pointer 68 is not visible on the actual screen 64.

By masking the pointer during discreet navigational operation, the pointer is less disruptive and fails to obscure menu items or other objects to a television viewer. Since the pointer is not used during the discreet navigational operation, masking the pointer also provides less confusion to a user. The ability to select a menu item without having to activate another key in the continuous navigational mode provides a simpler and quicker way for a user to select a menu item. Furthermore, it is easier to discern the position of the pointer from a distance since the pointer automatically highlights menu items with its movement. Finally, the pointer may be quickly located after discreet navigational method is used to select a menu item because the pointer will be near the center of the highlighted item.

Figure 6:
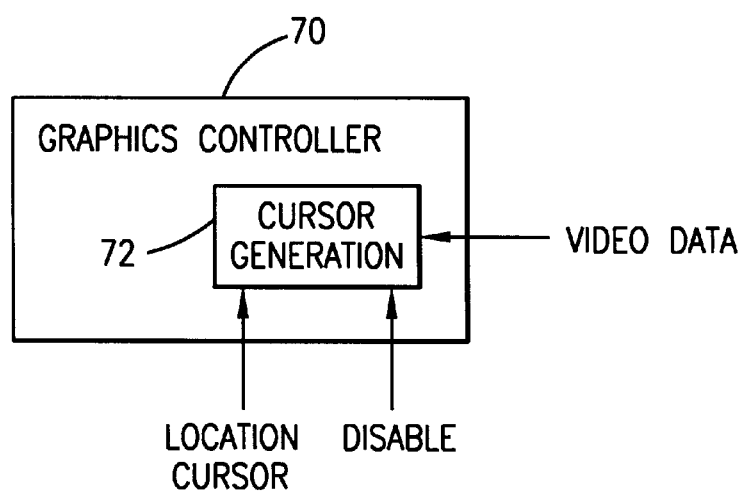
FIG. 6 illustrates an example graphics controller of the present invention.

Various methods and apparatus may be used to mask the pointer in the present invention. Software code executed by the graphics controller or the main processor of the computer system 10 or other type of controller may control the display of the cursor and pointer. FIG. 6 illustrates a block diagram of a graphics controller 70 of the computer system 10 which may be used to implement the present invention. The graphics controller 70 includes a cursor generation unit 72 which has a video data input, a cursor location input, and a disable input signal. The cursor generation unit 72 typically compares the pixel location of the video data input with the pixel location of the cursor location input. If the pixel locations match, the cursor generation unit 72 overrides the video data input with contrasting cursor video data. In order to mask the generation of the cursor, the graphics controller may disable the cursor generation unit 72 by activating the disable input. Alternatively to mask the pointer, the graphics controller may input the cursor location as single pixel on the cursor location input.

Although the preferred embodiment of the present invention has been described, it will be understood that the invention is not limited to the embodiment disclosed, but is capable of numerous arrangements, modifications and substitutions without departing from the spirit of the invention as set forth and defined by the following claims.

What is claimed is:

1. A method for selection of menu items in a menu on a display in a computer system, comprising the steps of:

highlighting a menu item in the menu using a first navigational method;

masking a screen object that has analog movement in a second navigational method; and relocating the screen object to a position corresponding to the highlighted menu item in the menu.

2. The method of claim 1 further including the step of displaying the menu in response to an activation of a menu display key.

3. The method of claim 2 wherein the menu display key is a navigational button.

4. The method of claim 3 wherein the menu is a system menu which lists various functional modes of operation of the computer.

5. The method of claim 1 wherein the first navigational method is a discrete navigational method and wherein the second navigational method is a continuous navigational method.

6. The method of claim 1 further including the step of selecting the highlighted menu item in the second navigational method in response to activation of a predetermined select key.

7. The method of claim 1 further including the steps of:

switching from the first navigational method to the second navigational method in response to activation of a device that controls movement of the screen object on the display; and unmasking the screen object in response to said switching step.

8. The method of claim 7 further including the steps of:

monitoring whether the screen object position overlaps a second menu item position; and highlighting the second menu item in the menu in response to the screen object overlapping the second menu item position.

9. The method of claim 1 wherein the step of relocating the screen object includes the step of relocating the screen object to a center position of the highlighted menu item.

10. A computer system comprising:

a computer display, a first device to control discrete movement of a cursor on the computer display in a first navigational mode;

a second device to control analog movement of a screen object on the computer display in a second navigational mode; and wherein the computer system masks the screen object in response to highlighting a menu item in the first navigational mode and relocates the screen object to a position on the computer display corresponding to the highlighted menu item.

11. The computer system of claim 10 further including a menu display key that activates display of the menu.

12. The computer system of claim 11 wherein the menu display key is a navigational button.

13. The computer system of claim 12 wherein the menu is a system menu which lists various modes of operation of the computer.

14. The computer system of claim 10 wherein the first navigational mode is a discrete navigational mode and wherein the second navigational mode is a continuous navigational mode.

15. The computer system of claim 10 further including a predetermined key for selecting the highlighted menu item in the second navigational mode.

16. The computer system of claim 10 wherein the second device is a trackball that controls continuous movement of a pointer on the computer display.

17. The computer system of claim 10 wherein the computer system unmasks the screen object in response to activation of the second device.

18. A computer system comprising:

a convergence functionality module;

a computer coupled to said convergence functionality module which operates in a first functional mode in response to said convergence functionality module and a second computer mode, which comprises:

a display for displaying a system menu;

a first device for controlling discrete movement of a cursor on said display in a first navigational method;

a second device for controlling continuous movement of a screen object on said display in a second navigational method; and a controller for masking the screen object in response to highlighting a menu item on the system menu in the first navigational method and for relocating the screen object to a position corresponding to the highlighted menu item.

19. The computer system of claim 18 wherein said convergence functionality module comprises a television receiver.

20. The computer system of claim 19 wherein the system menu lists at least the first functional mode and the second computer mode.

21. The computer system of claim 20 wherein the computer further comprises a navigational button that activates the display of the system menu on said display.

22. The computer system of claim 21 wherein said first device for controlling discreet movement of a cursor on said display in the first navigational method is a set of arrow keys on a remote and wherein said second device for controlling continuous movement of a screen object on the display in the second navigational method is a trackball on the remote.

* * * * *

UNITED STATES PATENT AND TRADEMARK OFFICE
CERTIFICATE OF CORRECTION

PATENT NO. : 5,905,497
DATED : May 18, 1999
INVENTOR(S) : Vaughan et al.

Page 1 of 1

It is certified that error appears in the above-identified patent and that said Letters Patent is hereby corrected as shown below:

Title page,
ABSTRACT,
Line 2, (two occurrences) replace "discrete" with -- discreet --
Line 3, replace "discretely" with -- discreetly --
Line 6, replace "discrete" with -- discreet --

Column 1,
Line 67, replace "discrete" with -- discreet --

Column 2,
Lines 16 and 34, replace "discrete" with -- discreet --

Column 6,
Line 56, replace "discrete" with -- discreet --

Column 7,
Lines 15 and 33, replace "discrete" with -- discreet --

Column 8,
Line 13, replace "discrete" with -- discreet --

Signed and Sealed this

Twelfth Day of March, 2002

*Attest:*

JAMES E. ROGAN
*Attesting Officer*   *Director of the United States Patent and Trademark Office*